R. P. GARSED & L. D. BUCK.
Feed and Blow-offs for Steam-Boilers.
No. 143,006.  Patented September 23, 1873.
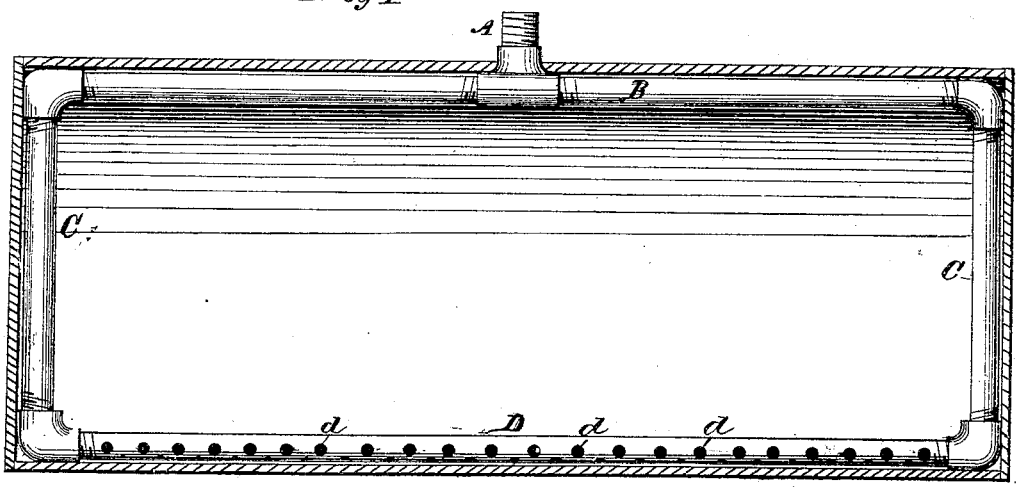
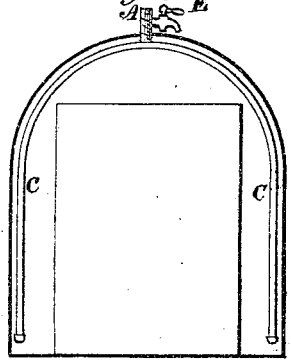
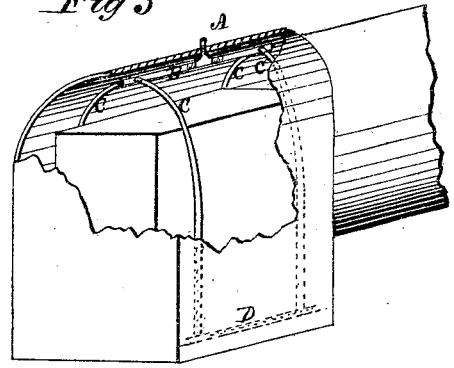

UNITED STATES PATENT OFFICE.

ROBERT P. GARSED, OF NORRISTOWN, AND ISAIAH D. BUCK, OF PHILADELPHIA, PA.; SAID BUCK ASSIGNS HIS RIGHT TO SAID GARSED.

IMPROVEMENT IN FEED AND BLOW-OFFS FOR STEAM-BOILERS.

Specification forming part of Letters Patent No. 143,006, dated September 23, 1873; application filed August 2, 1873.

*To all whom it may concern:*

Be it known that we, ROBT. P. GARSED, of Norristown, in the county of Montgomery and State of Pennsylvania, and ISAIAH D. BUCK, of the city and county of Philadelphia and State aforesaid, have invented a new and useful Improvement in Feed and Blow-Off for Steam-Boilers; and we do hereby declare the following to be a full and exact description of the same, reference being had to the accompanying drawings forming part of this specification, in which—

Figure 1 is a vertical sectional view of a cylinder-boiler with the apparatus attached; Fig. 2, an end view of a locomotive-boiler with the end removed; Fig. 3, a perspective view of a locomotive-boiler.

Similar letters of reference in the accompanying drawings denote the same parts.

The object of this invention is to provide, first, a simple, cheap, and efficient apparatus for feeding steam-boilers with water, in such manner as to keep an even temperature throughout the entire surface of the boiler, thus avoiding the danger of cracking the parts adjacent the supply-pipe, by contraction, when cold water is introduced; and, secondly, the means of more thoroughly removing, by blowing off the steam and water, the sediment which may have collected at the bottom, thereby preventing the formation of scale and burning the boiler at this point. To these ends, the invention consists in placing, inside the boiler, pipes along the top, bottom, and across the ends or around the sides, all connected together at the four corners, so as to form a circuit.

The supply-pipe communicates, through the top of the boiler, with the upper pipe on the inside. The lower pipe rests on or is laid near the bottom, and is provided with a sufficient number of small orifices to discharge the water forced through the pipes, as I will now proceed to describe.

A represents a supply-pipe of suitable size, which passes through the top of the boiler and connects with the upper pipe B on the inside. The latter is connected, by the end pipes C C, with the bottom pipe D, in which are a number of small orifices, $d\ d$, having capacity to discharge or receive about equal to the supply-pipe A, as shown in Fig. 1.

In the application of the apparatus to the locomotive-boiler, four pipes, C, are required, two from each side of the pipe B. The former are curved at the top to fit the boiler, and extend downward into the two side water-legs, where they are connected with the bottom pipes D, as shown in Figs. 2 and 3.

In this class of boilers the water is much deeper in the water-legs than at any other point, the volume being very small at the bottom; consequently the collection of sediment and liability to burn much greater; and, too, the introduction of cold water, which usually takes place in the water-legs, causing great change of temperature, owing to the small volume of water they contain, and thereby subjecting the iron to severe contraction, whereby it is often cracked, to avoid which the apparatus is placed as shown in Figs. 2 and 3.

The water, entering at A, passes into the pipe B, and is heated to a considerable degree by the steam, with which the pipe is surrounded, in its passage to the pipes C C, which convey it down, through steam and hot water, to the bottom pipe or pipes D, from which it is discharged, through the orifices $d\ d$, along the whole length of the pipes, into the boiler, heated to a degree almost equal to that of the water in the boiler itself, and, having been heated from the different portions of the water in the boiler through which the pipes pass, has changed but little the temperature of any particular portion thereof, and an equal temperature is maintained throughout all parts of the boiler. The contraction takes place in the pipes alone, and the danger of cracking the boiler therefrom wholly avoided.

When used as a blow-off, the supply-pipe is closed by a cock at $a$, and a discharge-pipe, E, opened. The water is discharged, first, from the bottom, where it is most impure, not merely from one point alone, as is the usual method, but from the whole length of the boiler or water-legs, as the case may be. As it rushes through the orifices $d\ d$ it will carry with it the sediment collected, and the cleaner water from the top will wash the bottom of the boiler in its outward passage.

Combined as both feed and blow-off, it requires but one opening, and consequent weakening of the boiler saved.

Having thus described our invention, what we claim is—

The combination of the pipes B, C, and D, arranged and operating as either or both feed and blow-off for steam-boilers, substantially as herein described.

ROBERT P. GARSED.
ISAIAH D. BUCK.

Witnesses:
 MILES MURPHY,
 WM. HAYWOOD.